US008393565B2

(12) United States Patent
Frank et al.

(10) Patent No.: US 8,393,565 B2
(45) Date of Patent: Mar. 12, 2013

(54) METHOD OF FEEDING ENERGY TO ACTUATORS ASSOCIATED WITH AN AIRCRAFT UNDERCARRIAGE

(75) Inventors: David Frank, Paris (FR); Jérôme Mehez, Morsang sur Orge (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 1035 days.

(21) Appl. No.: 12/267,404

(22) Filed: Nov. 7, 2008

(65) Prior Publication Data
US 2009/0152394 A1 Jun. 18, 2009

(30) Foreign Application Priority Data

Dec. 13, 2007 (FR) .................................. 07 08678

(51) Int. Cl.
*B64C 25/50* (2006.01)
(52) U.S. Cl. ...................... 244/50; 244/100 R
(58) Field of Classification Search .................. 244/50, 244/100 R
See application file for complete search history.

(56) References Cited

U.S. PATENT DOCUMENTS

| 2,400,587 | A | | 5/1946 | Livers |
| 2,569,670 | A | | 10/1951 | Hollerith |
| 3,581,682 | A | * | 6/1971 | Kontranowski ................. 180/55 |
| 3,807,664 | A | * | 4/1974 | Kelly et al. ...................... 244/50 |
| 7,369,922 | B2 | * | 5/2008 | Garcia ............................ 701/16 |
| 7,429,019 | B1 | * | 9/2008 | Bietenhader ............... 244/102 A |
| 7,445,178 | B2 | * | 11/2008 | McCoskey et al. ............. 244/50 |
| 7,975,960 | B2 | * | 7/2011 | Cox et al. ........................ 244/50 |
| 7,980,509 | B2 | * | 7/2011 | Bhargava ........................ 244/50 |
| 8,109,464 | B2 | * | 2/2012 | Bhargava ........................ 244/63 |
| 8,136,754 | B2 | * | 3/2012 | De Ruffray et al. ............. 244/50 |
| 2008/0217466 | A1 | * | 9/2008 | Bhargava ........................ 244/50 |
| 2009/0090810 | A1 | * | 4/2009 | De Ruffray et al. ............. 244/50 |
| 2010/0252675 | A1 | * | 10/2010 | Malkin et al. .................... 244/50 |
| 2010/0276535 | A1 | * | 11/2010 | Charuel et al. .................. 244/50 |

FOREIGN PATENT DOCUMENTS

CA 2479482 A1 3/2005

* cited by examiner

*Primary Examiner* — Kaitlin Joerger
(74) *Attorney, Agent, or Firm* — Sughrue Mion, PLLC

(57) ABSTRACT

The invention relates to a method of feeding energy to actuators associated with the undercarriages forming the landing gear of an aircraft, the aircraft comprising:
  a main power supply that operates independently of rotation of wheels carried by the landing gear; and
  a local power supply comprising one or more local generators, each driven by rotation of a wheel carried by an undercarriage;
  the method of the invention comprising the following steps:
  in a nominal mode of operation, powering said actuators by the local power supply; and
  in an additional mode of operation, when the delivery of energy by the local power supply is not sufficient, providing additional energy or all of the energy required by said actuators by means of the main power supply.

9 Claims, 5 Drawing Sheets

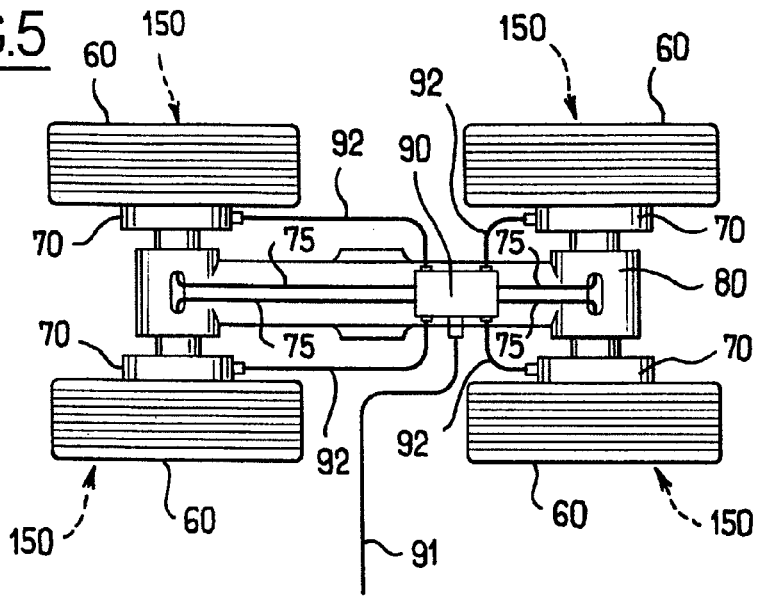
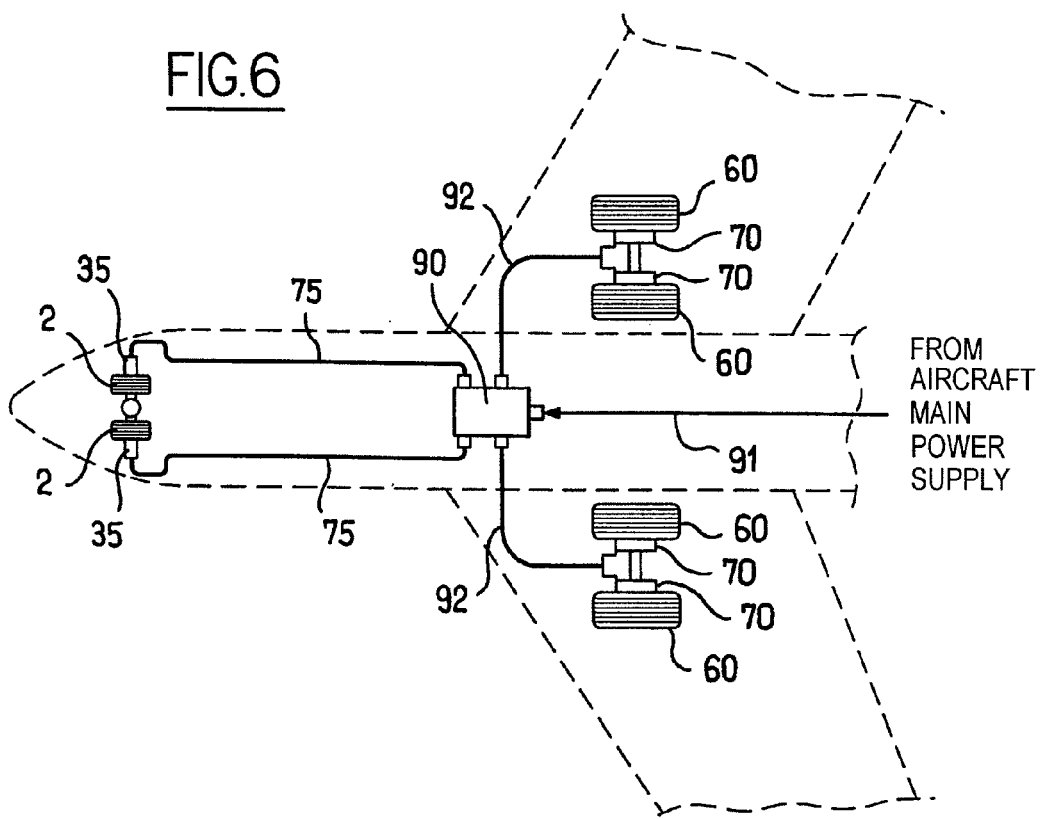
FROM AIRCRAFT MAIN POWER SUPPLY

METHOD OF FEEDING ENERGY TO ACTUATORS ASSOCIATED WITH AN AIRCRAFT UNDERCARRIAGE

The invention relates to a method of feeding energy to actuators associated with an aircraft undercarriage.

BACKGROUND OF THE INVENTION

Aircraft are generally provided with landing gear comprising a plurality of undercarriages, including a nose undercarriage and main undercarriages, the main undercarriages being fitted with brakes. Various actuators are associated with these undercarriages, including the following;
  braking actuators mounted on the undercarriage in association with the wheels for braking the aircraft.
The brakes are generally hydraulic brakes or electromechanical brakes;
  steering actuators for steering the steerable wheels carried by the various undercarriages making up the landing gear, e.g. by the nose undercarriage, or indeed on certain aircraft, by the main undercarriages; and
  drive actuators for retracting or extending undercarriages and the associated doors or hatches.
These actuators comprise both drive cylinders and locking catches for holding the undercarriages or the hatches in the closed position.

In order to power the various actuators, i.e. feed energy to them, use is generally made of the main power supply of the aircraft, as associated with the engines of the aircraft. The main power supply may comprise hydraulic pumps or electricity generators that are driven directly by the engines of the aircraft. The hydraulic pumps may also be driven by electric motors, themselves powered by the electricity generators of the aircraft.

Document CA 2 479 482 discloses an aircraft fitted with various hydraulic power supplies: a main power supply comprising pumps driven by electric motors and situated in the vicinity respectively of each of two main undercarriage and of the nose undercarriage, and a local power supply comprising two pumps driven by the wheels of the nose undercarriages when the aircraft is running on the ground. The local power supply is used in an emergency, in the event of the main power supply failing.

OBJECT OF THE INVENTION

The object of the invention is to provide a novel method of powering the actuators associated with undercarriages making up the landing gear of an aircraft.

BRIEF DESCRIPTION OF THE INVENTION

The invention provides a method of feeding energy to actuators associated with the undercarriages forming the landing gear of an aircraft, the aircraft comprising:
  a main power supply that operates independently of rotation of wheels carried by the landing gear; and
  a local power supply comprising one or more local generators each driven by rotation of a wheel carried by an undercarriage;
  the method of the invention comprising the following steps:
  in a nominal mode of operation, powering said actuators by the local power supply; and
  in an additional mode of operation, when the delivery of energy by the local power supply is not sufficient, providing additional energy or all of the energy required by said actuators by means of the main power supply.

Thus, according to the invention, the main power supply is used only in addition to the local power supply.

This reduces energy demand on the main power supply, thereby enabling it to be smaller in size, and thus leading to significant savings in weight. In addition, when only electromechanical actuators and an electrical main power supply are involved, it is possible to deliver energy from the main power supply to the actuators via a low voltage power supply line that suffices to deliver the additional energy required. This avoids having high voltage power supply cables running along the undercarriages, which would require large amounts of shielding and protection and would also require special precautions to be implemented for maintenance purposes insofar as they are capable of transporting high levels of power.

The local power supply preferably includes energy storage means enabling energy to be stored when said energy is not being used by the actuators or when the energy being demanded by the actuators is less than the energy being delivered by the local power supply.

BRIEF DESCRIPTION OF THE DRAWINGS

The invention can be better understood in the light of the following description given with reference to the accompanying drawings, in which:

FIG. 5 is a diagrammatic plan view of a main undercarriage rocker beam carrying four braked wheels including local power supply of the invention; and FIG. 6 is a diagrammatic plan view of an airplane with two main undercarriages and a nose undercarriage, and fitted with local power supply of the invention.

DETAILED DESCRIPTION OF THE INVENTION

Figure 1:
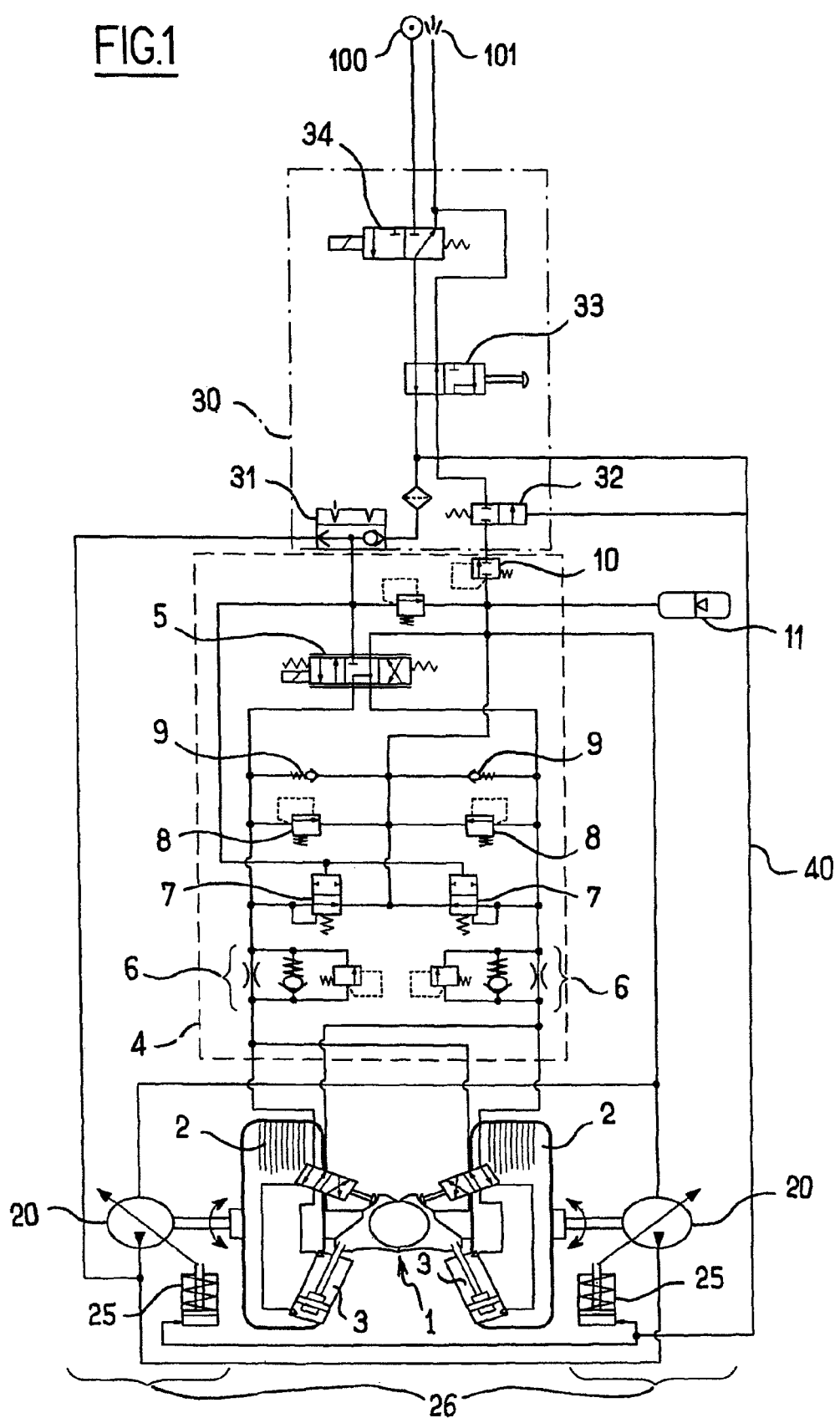
FIG. 1 is a diagram of a hydraulic architecture in accordance with a first implementation of the method of the invention, the architecture serving to power the steering control of a nose undercarriage.

With reference to FIG. 1, the method of the invention is applied to powering a steering control system carried by a nose undercarriage 1 having two wheels 2 that are steerable relative to the longitudinal axis of the undercarriage so as to steer the aircraft on the ground. In known manner, the steering control system comprises two actuators 3 in a push-pull configuration and adapted to cause the bottom steerable portion of the nose undercarriage 1 to turn. The actuators 3 are powered in highly conventional manner via a hydraulic unit 4 (in a dashed outline) that includes a servo-valve 5 for distributing pressure to one or the other of the chambers in each of the actuators 3 as a function of a steering setpoint coming from a control wheel operated by the pilot, or from an order generated by the on-board computer of the aircraft. Between the hydraulic unit 4 and the actuators 3 there are disposed rotary valves that act, as a function of the steering angle of the steerable portion of the nose undercarriage 1, to switch the chambers of the actuators 3 being powered by the hydraulic unit 4.

In known manner, the hydraulic unit 4 includes: anti-shimmy valves 6; short-circuit valves 7 for connecting all of the chambers of the actuators 3 to return when the hydraulic unit 4 is not powered, thereby leaving the wheels 2 free to swivel; pressure-release valves 9 for avoiding the actuator chambers being damaged during an attempt at forcibly steering the wheels (e.g. by a towing tractor) while the steering control is not in a neutral position; and finally booster valves 9 for filling the chambers of the actuators 3 which would otherwise suffer from cavitation. For this purpose, a rated valve 10 maintains the pressure in the hydraulic unit at a level that is higher than the return pressure of the aircraft. An accumulator 11 absorbs the flow rate differences between the chambers of the actuators 3 emptying and filling, and ensures that pressure is maintained in the hydraulic unit 4.

Figure 2:
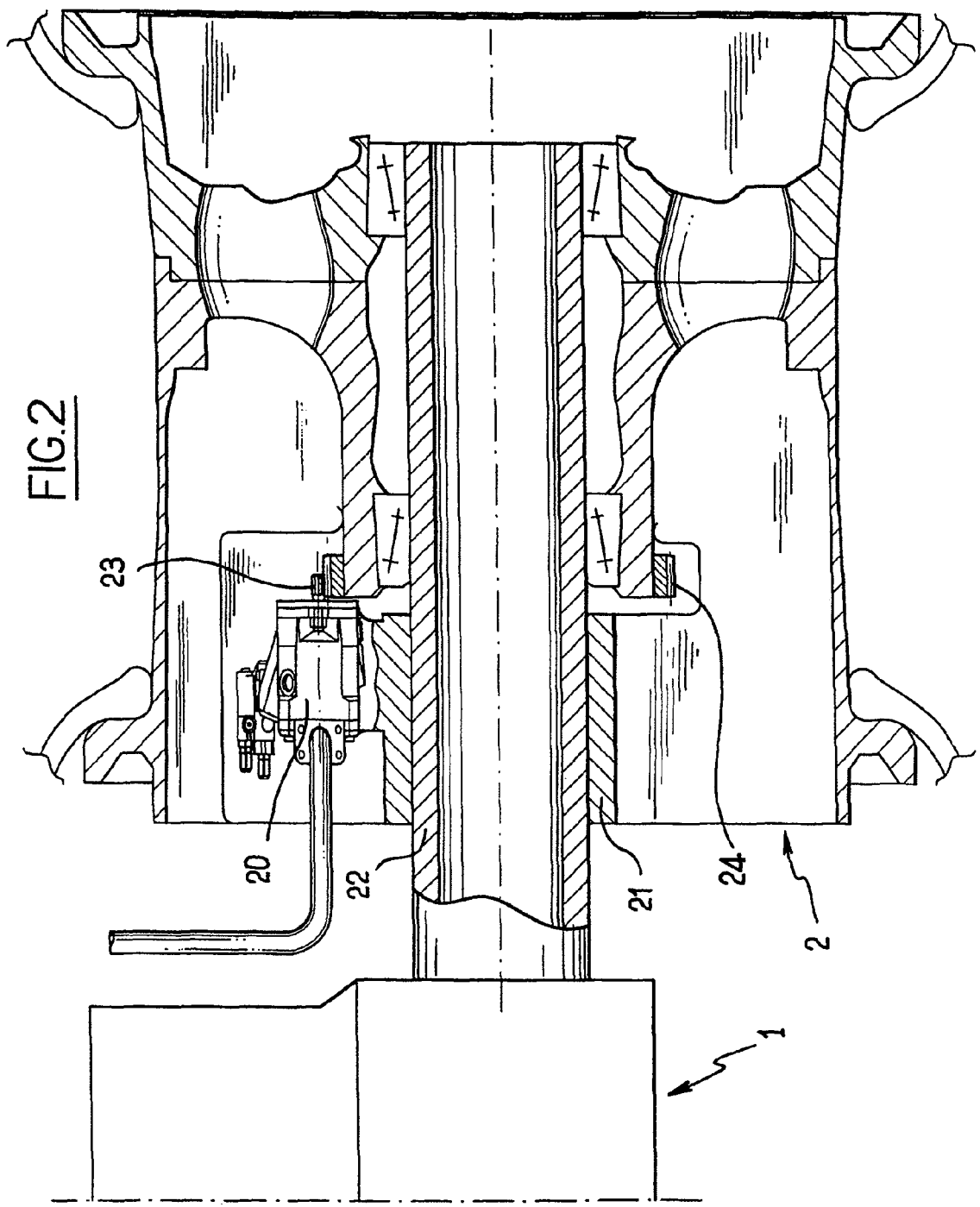
FIG. 2 is a diagrammatic section view of the installation of a pump in a nose undercarriage, forming part of the local power supply in FIG. 1.

The nose undercarriage 1 is fitted with local power supply 26 constituted in this example by two hydraulic pumps, each disposed in one of the wheels 2 so as to be driven by the associated wheel when it turns. The pumps 20 are variable rate pumps and they therefore generate energy in the form of a controlled flow of fluid under pressure when the wheels rotate. As can be seen better in FIG. 2, each pump 20 is mounted on a sleeve 21 that is engaged on the axle 22 receiving the wheel 2, the sleeve 21 being prevented from rotating about the axle by stop means that are not shown. The pump 20 has a drive shaft 23 with a toothed end that co-operates with a toothed ring 24 mounted on the hub of the wheel 2. Rotation of the wheel 2 while the aircraft is taxiing on the airport there causes the drive shaft 23 of the pump 20 to rotate.

It is advantageous to provide protection means that eliminate the pressure jolts that can be generated by the pumps 20 when the wheels start to rotate as a result of the aircraft landing. For example, with variable flow rate pumps as shown, the swash plate of the pump is put into a zero flow rate position and is subsequently moved progressively into a nominal flow rate position after the wheels have been set into rotation.

Returning to FIG. 1, it can be seen that the pumps 20 for the local power supply 26 are connected in parallel and feed the hydraulic unit 4 via a shuttle valve 31. The other inlet of the shuttle valve 31 is connected to the main power supply 100 of the aircraft, having pumps that are driven by the engines of the aircraft.

The shuttle valve 31 forms part of a distribution assembly 30 comprising:

an isolation valve 32 that acts, when the hydraulic unit is powered by the local power supply, to isolate the return line of the hydraulic unit 4 so that it operates in a closed circuit with the local power supply;

a cutoff valve 33 controlled mechanically during retraction of the nose undercarriage so as to connect the hydraulic unit 4 to return when the nose undercarriage is retracted into its bay; and a cutoff valve 34 that is electrically controlled for connecting the hydraulic unit 4 to return so long as steering control has not been activated, in particular in flight with the undercarriage deployed, or when running on the ground at high speed.

The assembly operates as follows. In a normal mode of operation, while the aircraft is taxiing on the airport to go to the terminal or to the takeoff runway, the wheels 2 rotate, thereby driving the pumps 20 and the local power supply 26. The pumps 20 deliver to the hydraulic unit via the shuttle valve 31. For this purpose, actuators 25 including springs hold the swash plates of the pumps 20 in a position that corresponds to the pumps 20 having a maximum flow rate. Pressure is then available from the local power supply so as to enable the wheels 2 to be steered and thus enable the aircraft to be steered. The return force of the steering hydraulic unit 4 is closed by the isolation valve 32 such that the hydraulic fluid has no option other than to return towards the pumps 20. The fluid thus flows around a closed circuit.

If one of the pumps 20 should fail, the other pump can continue to deliver. The steering hydraulic unit 4 then receives fluid flow at a rate that is halved, such that the wheels can continue to be steered, but with a drop in performance.

If the second pump 20 should fail, or if the aircraft is taxiing at a speed that is too slow for the pumps 20 to deliver sufficient output, then, in an additional operating mode, use is made of the pressure and the flow coming from the main power supply 100 so as to replace the supply of pressure and fluid flow coming from the local power supply.

To do this, the valve 34 is controlled to allow the pressure coming from the main power supply 100 to reach the shuttle valve 31. The shuttle valve switches, thereby allowing the pressure coming from the main power supply 100 to power the hydraulic unit 4 (the valve 33 is open since the nose undercarriage is deployed). A bypass 40 serves both to control the isolation valve 32 so that it puts the return force of the hydraulic unit 4 into communication with the return of the aircraft, and to power the actuators 25, which then cause the swash plates of the pumps 20 to return to their zero flow rate position. The pumps 20 of the local power supply 26 are thus neutralized. The hydraulic unit 4 is then powered solely by the main hydraulic power supply 100, and the return port of the hydraulic unit is connected to the return 101 of the aircraft.

Figure 3:
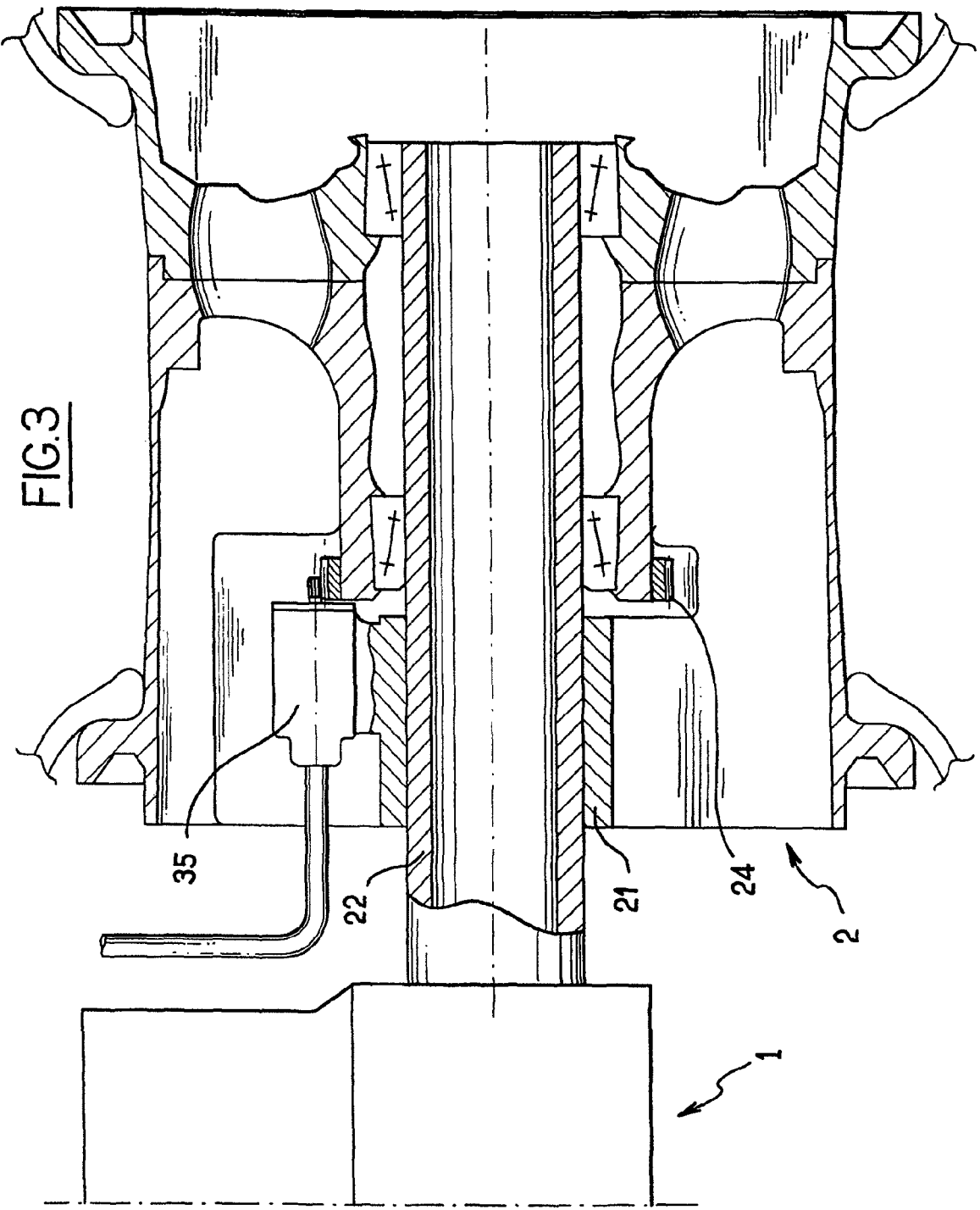
FIG. 3 is a view analogous to FIG. 2 showing the installation of an electricity generator in a nosewheel, forming part of the local power supply in a variant implementation of the method.

In a variant implementation shown in FIG. 3, instead of installing pumps in the wheels, it is possible to install electricity generators 35 therein that are connected to an electrically-driven pump (not shown), e.g. incorporated in the hydraulic unit 4. Thus, the local power supply then comprises two electricity generators 35 driven by the wheels, plus an electrically-driven pump having its electric motor powered by the electricity generators 35. Thus, while the wheels are revolving, the electricity generators 35 deliver electricity, thereby enabling the electric motor to drive the associated pump, thereby providing the pressure needed to operate the hydraulic steering control. The local power supply as constituted in this way preferably includes a buffer battery inserted between the electricity generators 35 and the electrically-driven pump to store the excess electrical energy generated by the electricity generators, and to regulate the delivery of energy to the electrically-driven pump.

Thus, for periods during which the electricity generators 35 are delivering electricity while the pilot is not making use of steering, the electricity delivered is stored in the buffer battery.

It is only when the buffer battery is insufficiently charged, and is therefore no longer capable of powering the motor of the electrically-driven pump correctly, that the distribution assembly 30 is used to switch over the power supply of the hydraulic unit 4 to the main hydraulic power supply 100.

In a variant, in the event of the buffer battery not being sufficient, it is also possible to connect the electrically-driven pump directly to the main electricity power supply of the aircraft so that it then delivers the electricity needed for driving the pump of the steering unit, taking over from the local electricity power supply.

Figure 4:
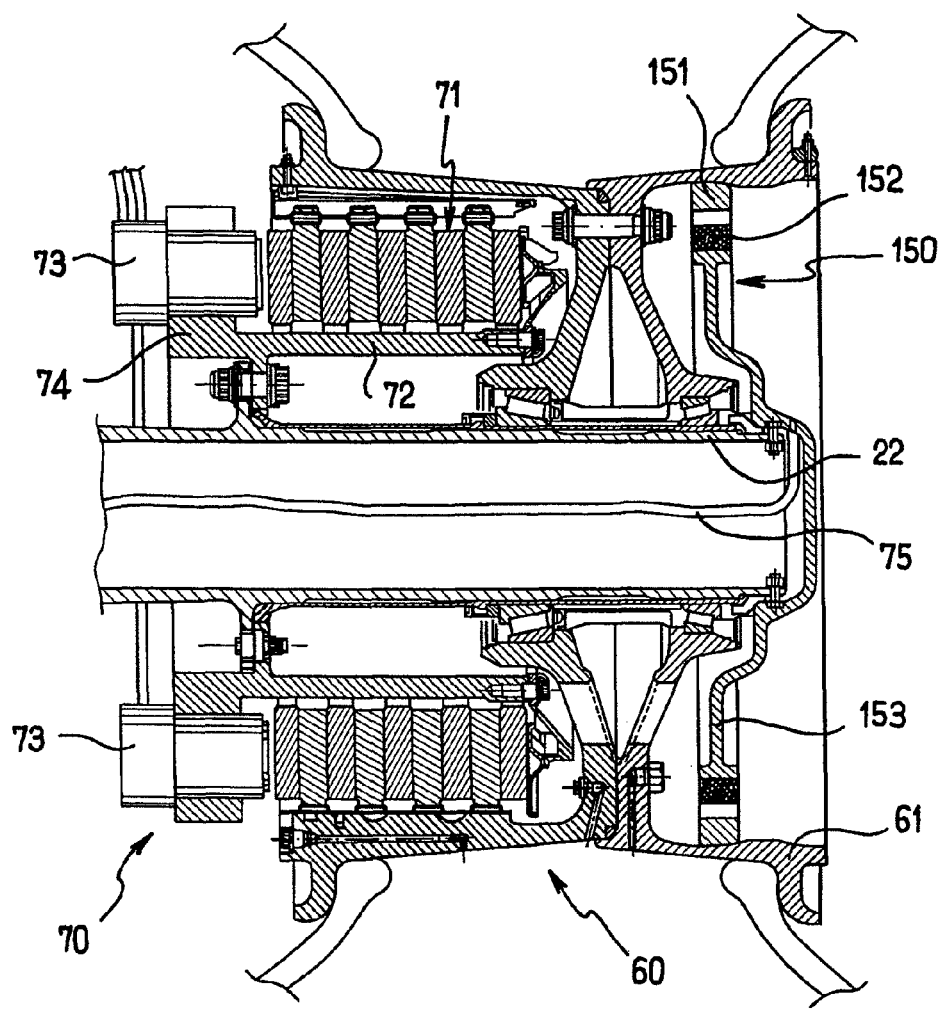
FIG. 4 is a diagrammatic section view of an undercarriage wheel fitted with an electromechanical brake and with an electricity generator forming part of the local power supply.

In another implementation of the invention as shown in FIG. 4, the local power supply comprises electricity generators 150 placed in the wheels 60 of the main undercarriages.

In the example shown, the wheels 60 of the main undercarriages are braked by electromechanical brakes 70 each comprising a stack of disks 71 including rotors that revolve with the rim 61 of the wheel 60 and stators that are prevented from rotating by a torsion tube 72. The disks 71 are pressed by electromechanical actuators 73 carried by a ring 74 facing the disks. Local power supply is used in this implementation for powering the brake actuators.

The electricity generators 150 of the local power supply comprise firstly a rotor 151 that is secured to the hub 61 of the wheel and that includes permanent magnets, and secondly a stator coil 152 mounted at the periphery of a disk 153 secured to the axle. Rotation of the wheel 60 induces an electric current in the stator coil 152 which current is collected by a cable 75 running inside the axle.

More precisely, and as can be seen in FIG. 5, which shows a main undercarriage having four wheels 60 fitted with electromechanical brakes 70 and carried by a rocker beam 80, the cables 75 that collect the electricity generated by the generators 150 bring the electricity they produce to a local unit 90 that includes means for rectifying the electricity, means for storing electricity such as a battery or storage capacitors, and means for selectively delivering the electricity as stored in this way to the electromechanical actuators of the brakes 70, e.g. via controlled inverters. The electricity is thus taken to the actuators 73 of the brakes 70 via cables 92.

Thus, on a single main undercarriage, the local electricity generators 150 all form part of the same local electricity power supply and they are therefore operated in common, such that if one of the local electricity generators 150 fails, the others continue to deliver, thereby ensuring a power supply for the brake mounted on the wheel whose electricity generator has failed.

In a variant, it is possible to operate the local generators of only two wheels in common instead of all four wheels, e.g. by operating in common the local generators of the two wheels carried by the same axle, such that the rocker beam has two local power supplies.

Furthermore, the aircraft continues to have a main electricity power supply available, comprising alternators driven by the engines of the aircraft, or where appropriate by an auxiliary power unit, and in general also batteries for delivering electricity when the aircraft is at rest.

Thus, in a normal mode of operation, the electromechanical braking actuators 73 are powered the associated local power supply 90. In practice, electricity is preferably taken from the storage means of the local power supply 90, thus making it possible both to store surplus energy produced by the local generators 150 associated with the local power supply 90, and to regulate the supply of energy to the electromechanical braking actuators 73. In the event of the storage means being completely empty, the electricity available for the electromechanical braking actuators 73, although transiting via the storage means, would in fact be delivered just in time by the local generators 150, with the electricity supply then depending on the speed of rotation of the wheels, and thus on the travel speed of the aircraft. It is then only when traveling at very slow speed that the local generators 150 can no longer deliver sufficient electricity to satisfy the power requirements of the electromechanical actuators 73. Under such circumstances, the invention enables additional energy to be taken from the main power supply of the aircraft. Nevertheless, given that the airplane is then running at very slow speed, the braking force that needs to be developed is small, and the additional energy coming from the main power supply is itself small in comparison with the powers normally involved when braking.

Thus, the connection 91 between the local unit and the main power supply for delivering this additional energy can advantageously be selected to be of the low voltage type. This disposition avoids having high voltage cables from the main electricity power supply running down along the undercarriages, thereby achieving a significant weight saving that compensates at least in part for the weight of the local power supply, thus facilitating installation on the undercarriage and avoiding the usual precautions that need to be taken with high voltage cables that might be handled or approached by personnel on the ground. Thus, the only high voltage cables present on the undercarriage are the cables 75 and 92, and they are carried solely by the rocker beam 80, and not by the leg of the undercarriage.

This additional energy taken from the main power supply then advantageously comes from the low voltage electricity networks of the aircraft that are powered by the alternators or by the battery of the main electricity power supply.

In a variant implementation, the electricity generated by the local electricity generators can be operated in common not only within a single undercarriage, but over all of the undercarriages, or over only some of them, e.g. only over the main undercarriages. This enlarged operation in common increases the availability of the actuators powered by local power supply. Nevertheless, such a configuration requires high-voltage cables to be run along the undercarriages concerned.

On the contrary, it may be decided to avoid any operation in common, with each of the brakes 70 being powered by the local power supply carried by the associated wheel. Failure of the local generator would then lead to the loss of the associated brake, but that can be acceptable from a safety point of view and for availability of the aircraft.

In a third implementation shown in FIG. 6, the local power supply 90 comprises local electricity generators 35 implanted in the wheels of the nose undercarriage 1, and serves to power the electromechanical brake actuators 70 fitted to the wheels 60 of the main undercarriages. The electricity generated by the local generators 35 is taken to the local unit 90 by cables 75 going up along the nose undercarriage so as to be delivered to the brake actuators by the cables 92. The local unit 90 is connected to the main power supply via a low voltage cable 91 so as to be capable of receiving, where appropriate, additional energy from the main power supply. Advantageously, the local unit 90 is used for powering the steering actuators of the nose undercarriage.

The invention is not limited to the above description, but on the contrary covers any variant coming within the ambit defined by the claims. In particular, it is also possible to power the driving actuators used for extending and retracting the undercarriages from the local power supply, providing it is fitted with energy storage means.

What is claimed is:

1. A method of feeding energy to actuators associated with the undercarriages forming the landing gear of an aircraft, said actuators being at least one of braking actuators, steering actuators and drive actuators for retracting or extending undercarriages, doors or hatches, the aircraft further comprising:
a main power supply that operates independently of rotation of wheels carried by the landing gear; and
a local power supply comprising one or more local generators, each driven by rotation of a wheel carried by an undercarriage;
the method comprising the following steps:
in a nominal mode of operation, powering said actuators by the local power supply; and in an additional mode of operation, when the delivery of energy by the local power supply is not sufficient, providing additional energy or all of the energy required by said actuators by means of the main power supply.

2. The method according to claim 1, wherein the local power supply includes means for storing the energy delivered by the local generator(s), the storage means being inserted between the local generator(s) and the actuators so as to form a buffer.

3. The method according to claim 1, applied to an aircraft having a nose undercarriage with two steerable wheels, the local power supply comprising two local generators, each associated with a respective one of the wheels of the nose undercarriage, the local power supply being used for powering actuators for controlling steering of the wheels of the nose undercarriage.

4. A method of feeding energy to actuators associated with the undercarriages forming the landing gear of an aircraft, said actuators being at least one of braking actuators, steering actuators and drive actuators for retracting or extending undercarriages, doors or hatches, the aircraft further comprising:
- a main power supply that operates independently of rotation of wheels carried by the landing gear; and
- a local power supply comprising one or more local generators, each driven by rotation of a wheel carried by an undercarriage;

the method comprising the following steps:
- in a nominal mode of operation, powering said actuators by the local power supply; and
- in an additional mode of operation, when the delivery of energy by the local power supply is not sufficient, providing additional energy or all of the energy required by said actuators by means of the main power supply,
wherein said method is applied to an aircraft having at least one main undercarriage carrying wheels with brakes including braking actuators, the local power supply comprising at least one local generator associated with one of the wheels of the main undercarriage, the local power supply being used for powering at least the brake actuators of the wheel concerned.

5. The method according to claim 4, wherein the local power supply includes as many generators as the main undercarriage has wheels, the local power supply comprising a local unit to which the local generators are connected, the local unit being adapted to distribute the energy collected in this way to the brake actuators of the wheels of the main undercarriage.

6. The method according to claim 5, wherein the local unit has means for storing the energy delivered by the local generators, and means for selectively distributing energy to the braking actuators.

7. The method according to claim 1, applied to an aircraft having a nose undercarriage, the local power supply comprising two local generators each associated with a respective one of the wheels of the nose undercarriage, the local power supply comprising a local unit to which the local generators are connected, the local unit being adapted to deliver the energy as collected in this way to the brake actuators of the wheels of the main undercarriages of the aircraft.

8. The method according to claim 1, wherein the actuators comprise drive cylinders.

9. The method according to claim 1, wherein the actuators comprise braking actuators.

* * * * *